Oct. 11, 1938.     L. W. WILLIAMS ET AL     2,133,004
FILTER
Filed Aug. 11, 1936
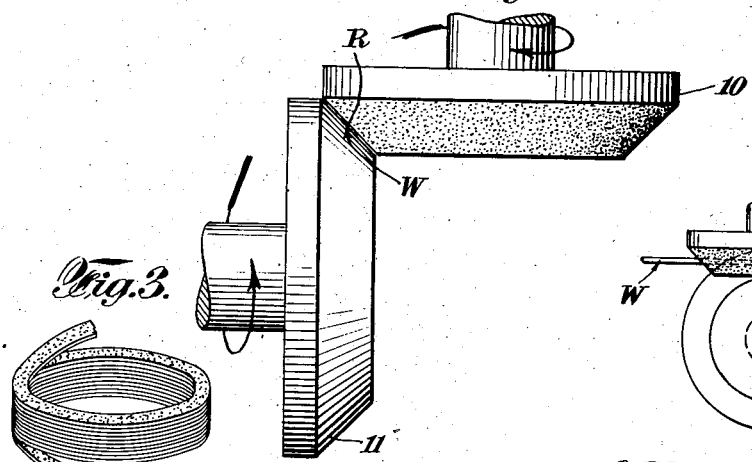
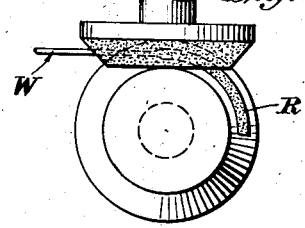
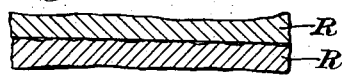
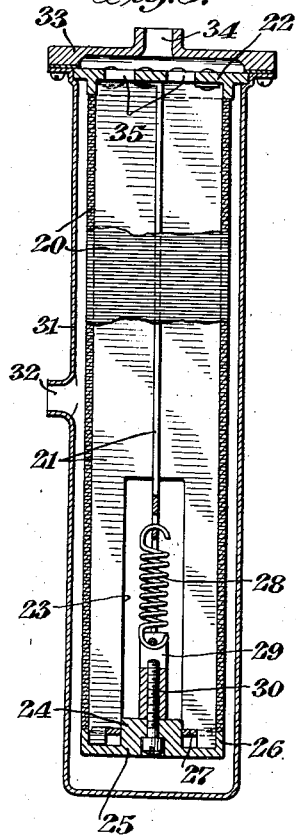
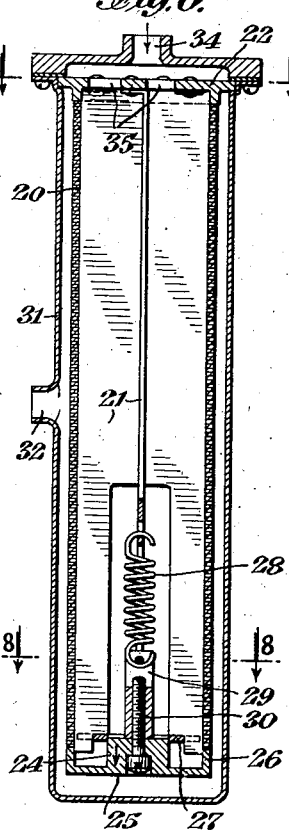
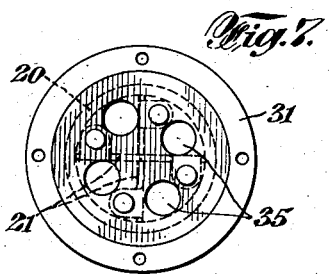
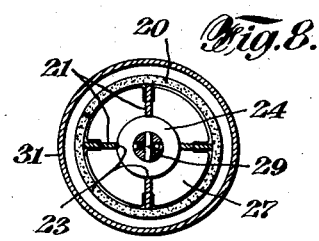
INVENTORS.
Lewis A. Williams
George A. Arnold
BY
Kenyon & Kenyon
ATTORNEYS Patented Oct. 11, 1938

2,133,004

UNITED STATES PATENT OFFICE 2,133,004

FILTER

Lewis W. Williams, Short Hills, and George A. Arnold, Chatham, N. J., assignors to Motor Improvements, Inc., Newark, N. J., a corporation of Delaware Application August 11, 1936, Serial No. 95,330

5 Claims. (Cl. 210—169)

This invention relates to filters and more especially to metal ribbon filters of the type disclosed in the patent to R. P. F. Liddell, No. 2,042,537. The filter disclosed in said Liddell patent comprises a helix of metal ribbon having contacting turns, the filtering interstices being provided through the medium of transverse ribs formed on one face of the metal ribbon. The proper curvature is given to the ribbon and the transverse ribs are formed thereon by passing the ribbon between conical pressure rolls, one of which is provided with a series of slots which result in the formation of the ribs.

An object of the present invention is a filter of the type above described having extremely minute filtering interstices whereby it is capable of filtering out the most minute particles.

The minute spacing of the turns of the helix is attained by the use of specially prepared pressure rolls in the operation of shaping the ribbon. One of the pressure rolls is formed with a surface of glass-like smoothness while the other pressure roll is sand-blasted with sand grains of a definite size projected at a predetermined velocity. By selection of the size of the sand grains and control of the velocity of projection, the depth of the recesses formed in the pressure roll can be accurately regulated to produce projections on the ribbon of the desired height to yield filtering interstices of the desired size. The resulting projections on the ribbon may be made microscopic in size and form filtering interstices of the same order of magnitude.

Other objects, novel features and advantages of this invention will become apparent from the following specification and accompanying drawing, wherein:

Fig. 1 is a plan view of a pair of pressure rolls for forming the metal ribbon of which the filtering element of the present invention is composed.

Fig. 2 is a side elevation thereof;

Fig. 3 is a fragmentary perspective view of a filtering element embodying the invention;

Fig. 4 is an enlarged fragmentary section on the line 4—4 of Fig. 3;

Fig. 5 is a vertical section through a filter having a filtering element embodying the invention;

Fig. 6 is a similar view with the filtering element slightly extended for cleaning;

Fig. 7 is a section on the line 7—7 of Fig. 6, and

Fig. 8 is a section on the line 8—8 of Fig. 6.

In Figs. 1 and 2, a pair of pressure rolls are driven by any suitable means (not shown) and between them is passed a wire W which is pressed into a ribbon R and given a predetermined curvature as described in said Liddell patent, No. 2,042,537. The operating face of the roll 10 is provided with minute depressions while the operating face of the roll 11 is of glass-like smoothness. The minute depressions in the face of the roll 10 are produced by projecting against it sand grains of definite size at a predetermined velocity. The sand grains produce microscopic depressions and the depth of the recesses thus formed is regulated by selection of the size of the sand grains and control of the projection velocity. The ribbon R is therefore produced with one surface of glass-like smoothness and with its opposite surface having minute projections and may be indistinguishable by the human eye and be visible only through the medium of a microscope. The ribbon R is formed into a helix as described in said Patent No. 2,042,537 and when suitably mounted constitutes a filtering element capable of removing the finest of particles from a liquid. The minute projections on the one face contact the glass-like surface of the other face, thereby insuring uniformity of filtration throughout the entire surface of the filtering element. The provision of one surface of glass-like smoothness prevents any possibility of variation in the filtering interstices throughout the length of the ribbon.

In Fig. 3, there is shown a fragment of a filtering element to illustrate the general subject-matter of the filtering element and its arrangement while in Fig 4 is illustrated the difference between the two faces of the ribbon R. In Fig. 4, the lower fragment is from the upper portion of a turn of the ribbon R while the upper fragment is from the lower portion of the next turn of a ribbon R. The upper surface of the lower fragment is provided with the minute projections which define the filtering interstices while the lower surface of the upper fragment is of the glass-like smoothness previously mentioned.

In Figs. 5 to 7, 20 is a filtering element comprising a helix composed of ribbon produced in accordance with the previously described procedure and having the surface characteristic resulting from such procedure. The helix 20 is mounted on a frame 21 which consists of two cross metal strips suitably inter-connected. To one end of the frame 21 is fixed a head 22 against which abuts one end of the helix 20. The other end of the frame is recessed at 23 and into this recess projects the hub 24 of a cap 25 having a flange 26 overlying the end of the frame, the cap being capable of sliding movement on the frame toward and away from the cap 22. A spider or retainer 27 is carried by the ends of the strips which form the frame 21 the acts as a guide for the hub 24. Also, within the recess 23 is a spring 28, one end of which is attached to the frame and the other end of which is attached to the cap 25 through the medium of a yoke 29 and bolt 30. The filter element is arranged within a casing 31 having an inlet 32, the casing being provided with a cap 33 having an outlet 34 communicating with apertures 35 in the cap 22.

In operation, liquid to be filtered is introduced into the casing through the inlet 32 and passes inwardly through the interstices in the helix 20 into the interior thereof from which it is discharged by way of the apertures 35 through the outlet 34. Cleaning of the filter is effected by reversing the flow of liquid, thereby establishing a pressure differential between the interior and exterior of the filtering element. This pressure differential causes the cap 25 to move from the position shown in Fig. 5 to the position shown in Fig. 6 and permitting corresponding expansion of the helix with resulting slight spacing of the turns. The outward flow of liquid through the turns washes out any deposit of filtrate and cleans the filter. As soon as the pressure differential between the interstices and the exterior of the filter is removed, the spring 28 returns the cap 25 to its original position, thereby causing the turns of the helix again to be brought into contact. The turns remain in contact during normal operation of the filter since the pressure exterior of the filtering element is greater than the pressure within the filtering element and differential tends to move the cap 25 towards the cap 22.

We claim:

1. A filter comprising a helix of metal ribbon having contacting turns, one face of said ribbon being smooth and the other face being provided with microscopic projections produced from pressure applied thereto by a sand-blasted surface.

2. A filter comprising a frame, and a metal ribbon helix supported by said frame, one face of said ribbon being smooth and the other face being provided with irregularly arranged microscopic projections of varying height defining minute interconnecting tortuous channels of varying depth between adjacent turns from one side of the helix to the other.

3. A filter according to claim 2 in which said other surface has the reverse characteristics of a sand-blasted surface.

4. A filter comprising a frame, a metal ribbon helix supported by said frame, one face of said ribbon being smooth and the other face being provided with irregularly arranged microscopic projections of varying height defining minute interconnecting tortuous channels of varying depth between adjacent turns from one side of the helix to the other, a cap for each end of said helix, and resilient means urging said caps toward each other.

5. A filter according to claim 4 in which said other surface has the reverse characteristics of a sand-blasted surface.

LEWIS W. WILLIAMS.
GEORGE A. ARNOLD.